US006484403B1

(12) United States Patent
Macklin et al.

(10) Patent No.: US 6,484,403 B1
(45) Date of Patent: Nov. 26, 2002

(54) METHOD OF CONVERTING A TRACTION MOTOR WITH SLEEVE BEARINGS TO ROLLER BEARINGS

(75) Inventors: John E. Macklin, Fremont, NE (US); Paul Bien, Downers Grove, IL (US); Roger M. Boor, Bolingbrook, IL (US)

(73) Assignee: Magnus/Farley, Inc., Fremont, NE (US)

( * ) Notice: Subject to any disclaimer, the term of this patent is extended or adjusted under 35 U.S.C. 154(b) by 0 days.

(21) Appl. No.: 09/672,427

(22) Filed: Sep. 28, 2000

(51) Int. Cl.[7] .................................................. B23P 6/00

(52) U.S. Cl. ............................... 29/898.01; 29/898.07; 29/898.08; 29/898.13; 29/401.1; 29/402.08

(58) Field of Search ......................... 29/898.01, 898.07, 29/898.08, 898.09, 898.13, 888.011, 401.1, 402.06, 402.08, 402.19

(56) References Cited

U.S. PATENT DOCUMENTS 5,373,632 A * 12/1994 Lucier et al. .......... 29/888.011
5,504,996 A * 4/1996 Popovits et al. ......... 29/898.01

* cited by examiner

*Primary Examiner*—Gregory M. Vidovich
*Assistant Examiner*—Eric Compton

(74) *Attorney, Agent, or Firm*—Hamman & Benn; Adam K Sacharoff

(57) ABSTRACT

A method for converting a locomotive traction motor originally equipped with sleeve bearings to roller bearings is provided. The ensuing method includes removing all parts of the original motor leaving only the motor frame. Recesses are then machined in the motor frame at both the pinion end and commutator end. The recesses are sized accordingly, to receive the roller bearings, which have a larger diameter then the sleeve bearings. Upper and lower frame inserts, each having an additional mounting opening, are then mounted to the machined frame to increase the strength and stiffness around the machined regions. A replacement axle is then equipped with the roller bearings, a pair of labyrinth seals, a gear and a pair of wheels. A pair of bearing housings may then be placed over the roller bearings. Each bearing housings has a reservoir that when the traction motor is assembled, is in communication with the roller bearings. Each bearing housing further includes an aperture in communication with the reservoir, such that grease may be added through the aperture to the reservoir and the roller bearings periodically. The bearing housing further include a bore, which is integrally cast into the bearing housings and sized to receive the outer race of the roller bearings. Lastly, an axle shield is attached between the two bearing housings protecting the axle and bearings from dirt and foreign particles. The entire axle/wheel assembly is then bolted to the machined frame.

11 Claims, 16 Drawing Sheets

METHOD OF CONVERTING A TRACTION MOTOR WITH SLEEVE BEARINGS TO ROLLER BEARINGS

FIELD OF THE INVENTION

This invention relates generally to a method of converting a locomotive traction motor equipped with a sleeve bearing system to a roller bearing system.

BACKGROUND OF THE INVENTION

With the increasing use of locomotive traction motors with roller bearings in place of sleeve bearings, the ability and need to convert the traction motors originally equipped with sleeve bearings to roller bearings also increases. Rather then replacing the entire traction motor with a new motor, various methods of machining the traction motor originally equipped with sleeve bearings to receive roller bearings have been attempted. In some circumstances the components of the sleeve bearing systems were adapted and modified such that these elements may be used for the roller bearing system. However, once the traction motor is machined the overall strength of the traction motor, to adequately receive the roller bearings and axle, is compromised. Moreover, by using components of the sleeve bearing system, the roller bearings may not be adequately supported against the traction motor. Also, in some prior attempts the standard original equipment manufacturer, referred to as “OEM”, gear cases are modified and reused. This modification requires a modified or new OEM seal, which may result in higher gear or gear case failures. In addition, these modifications require jacking bolts in order to maintain a tight fit and good alignment. However, the use of jacking bolts lacks in its ability to position the bearing housings more accurately and permanently. As such, a greater need exists to provide a method of converting the traction motor equipped with sleeve bearings to roller bearings, while adequately supporting the traction motor and the roller bearings when the conversion is complete.

Consequently, there remains a continuing need for a more improved and efficient method for converting a sleeve bearing system to a roller bearing system. Such a need also exists for the conversion to maintain or replenish the diminished strength in the traction motor. Such a need also exists for the conversion to reuse the OEM gear case without any modification to the OEM gear case, permitting the use of OEM seal also without modifications. Such a need also exists to adequately support and align the position of the bearing housings. Additionally, the need exists to provide for an increased clamp load, and prevent loss of bolt torque, while maintaining strength and rigidity in the converted traction motor frame and bearing housing assembly.

SUMMARY OF THE INVENTION

In accordance with the present invention, there is provided a method for converting a locomotive traction motor originally equipped with sleeve bearings to roller bearings. The ensuing method includes removing all parts of the original motor, leaving only the motor frame. Recesses are then machined in the motor frame at both the pinion end and commutator end. The recesses are sized accordingly, to receive the roller bearings, which have a larger diameter then the sleeve bearings. Upper and lower frame inserts, each having provision for additional mounting opening, are also attached to the machined frame to increase the strength, stiffness and clamp loads around the machined regions. A replacement axle is then equipped with the roller bearings, a pair of labyrinth seals, a gear and a pair of wheels. A pair of bearing housings are placed over the roller bearings. Each bearing housing has a reservoir, which when the traction motor is assembled, is in communication with the roller bearings. Each bearing housing further includes an aperture in communication with the reservoir, such that grease may be added through the aperture to the reservoir and the roller bearings periodically. The bearing housing further includes a bore, which is integrally cast into the bearing housing and sized to receive the outer race of the roller bearings. An axle shield is attached between the two bearing housings protecting the axle and bearings from dirt and foreign particles. The entire axle/wheel assembly is then bolted to the machined frame using a tight spline fit to insure permanent good alignment without requiring jacking bolts.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE DRAWINGS

Figure 1A:
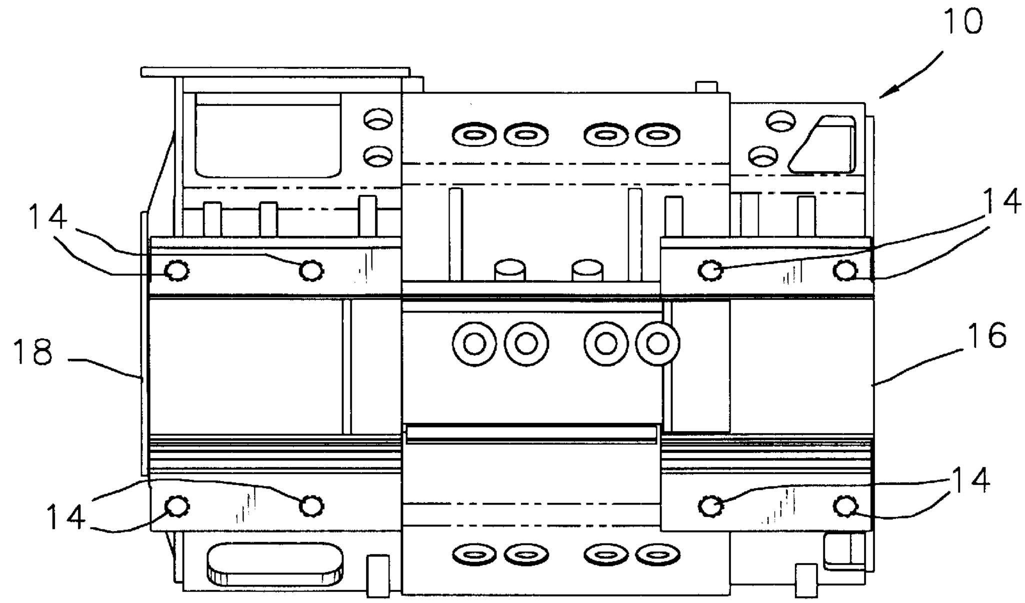
FIG. 1A PRIOR ART
FIG. 1A is a front view of a traction motor frame equipped to receive sleeve bearings.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 1B:
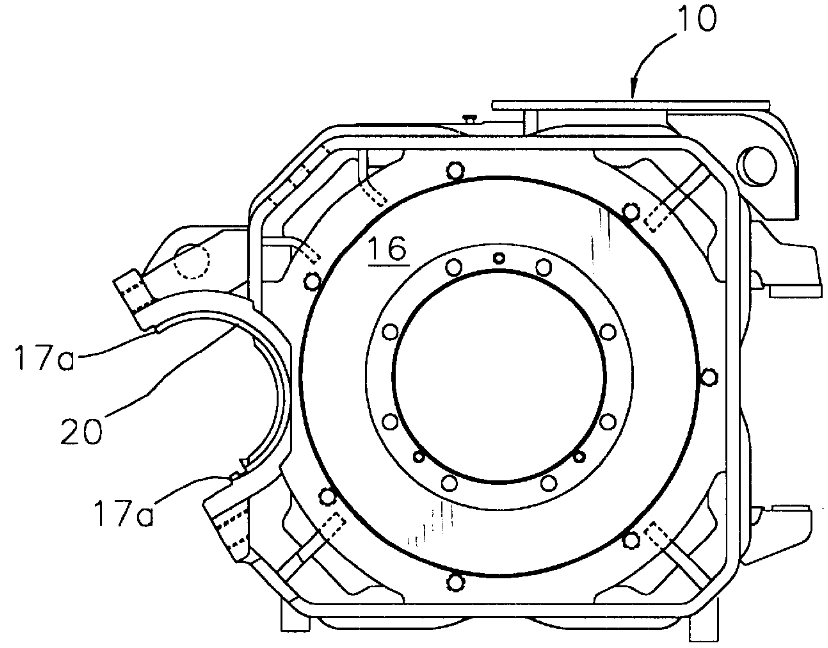
FIG. 1B PRIOR ART
FIG. 1B is a side view of FIG. 1A from the pinion end.
Figure 1C:
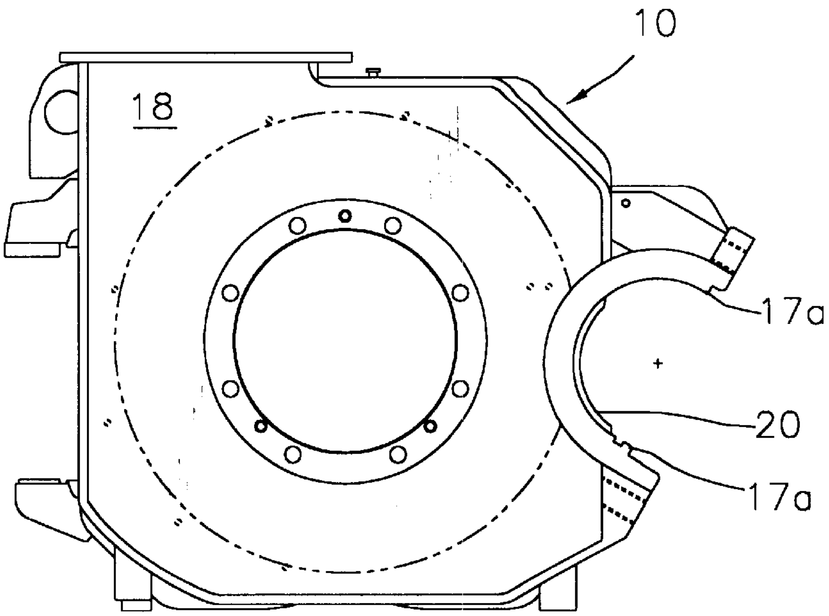
FIG. 1C PRIOR ART
FIG. 1C is a side view of FIG. 1A from the commutator end.
Figure 2A:
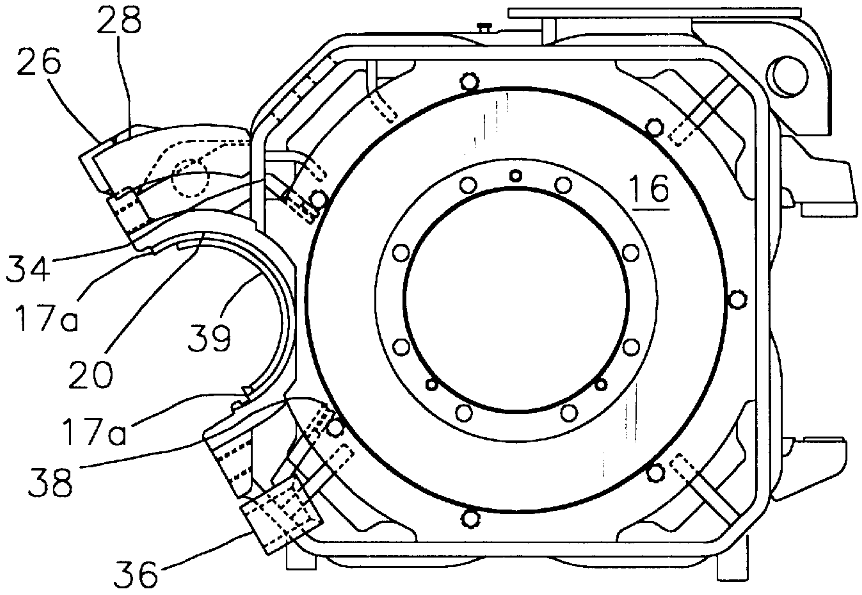
FIG. 2A is a pinion end view of a traction motor with upper and lower inserts positioned on the motor.
Figure 2B:
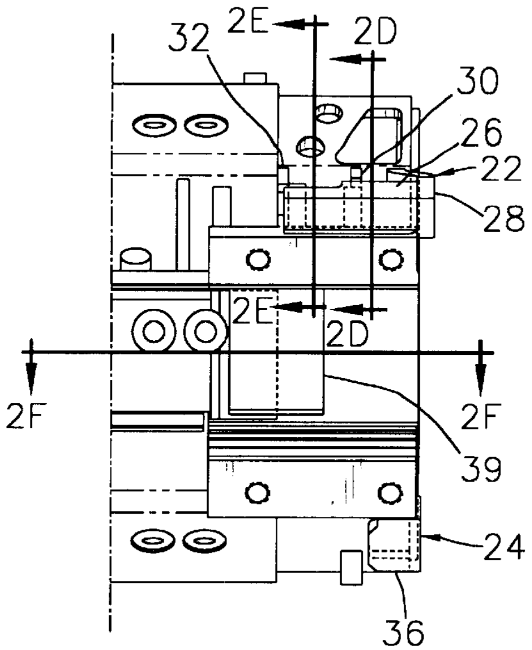
FIG. 2B is a front view of FIG. 2A.
Figure 2D:
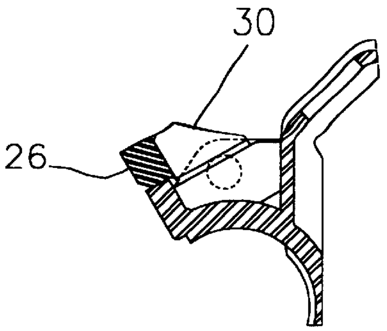
FIGS. 2D and 2E are cross sectional views of the upper inserts taken about section lines 2D—2D and 2E—2E, respectively.
Figure 2E:
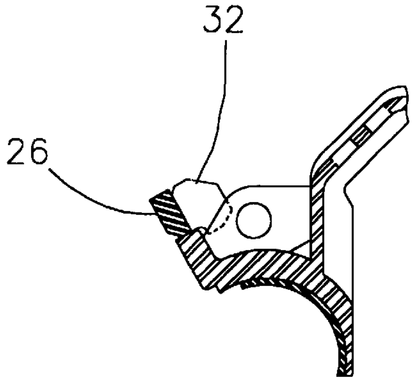
Figure 2C:
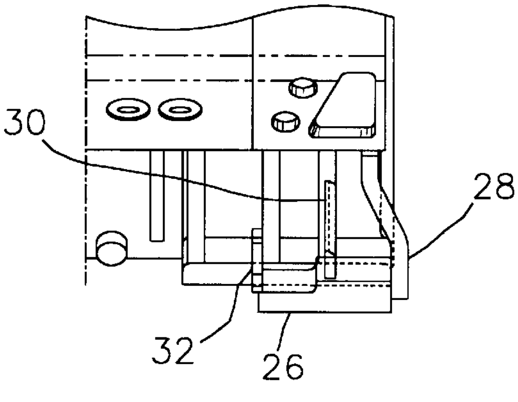
FIG. 2C is a top view of FIG. 2B.
Figure 2F:
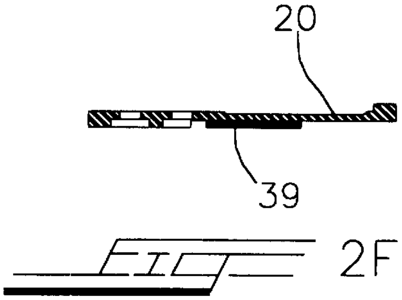
FIG. 2F is a cross sectional view of the semi-cylindrical plate.
Figure 3A:
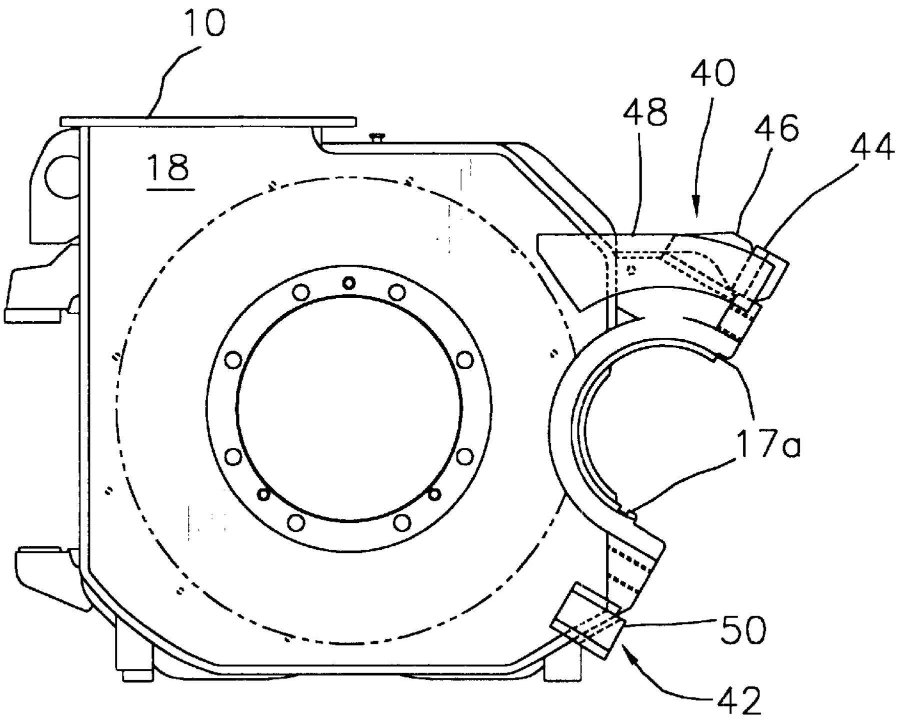
FIG. 3A is a commutator end view of a traction motor with upper and lower inserts positioned on the motor.
Figure 3B:
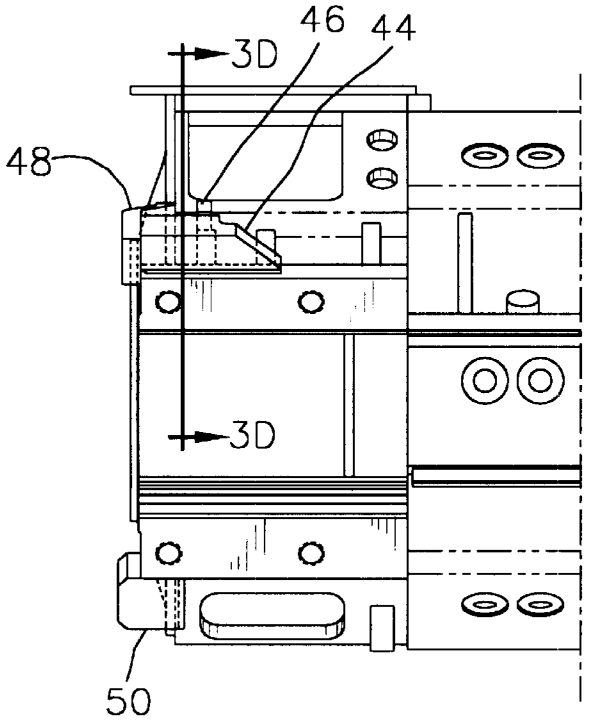
FIG. 3B is a front view of FIG. 3A.

The ensuing method covers the conversion of a locomotive traction motor assembly equipped with sleeve support bearings to roller support bearings. With reference to FIGS. 1A to 1C, a frame 10 for a locomotive traction motor assembly in accordance with the prior art is equipped to receive sleeve support bearings. As illustrated, all of the parts of the motor frame 10 have been removed, such as the bearing caps, the sleeve bearings, the axle, the armature, etc. To accommodate for the bearing caps and the sleeve bearings the frame 10 includes a semi-cylindrical notch 20 at the pinion end 16 (referred to herein as "PE") and the commutator end 18 ("CE"). In addition, the frame 10 includes mounting holes 14 located in the upper and lower portion of the frame 10 at both ends. The bearing caps (not shown) position over the sleeve bearings, which are mounted in the semi-cylindrical notches 20. The bearing caps are aligned with female splines 17*a* on the frame 10 and secured to the frame 10 by bolts through the mounting holes 14. The bearing caps further include lubricant that is supplied to the axle (not shown) and the sleeve bearings, as known in the art.

To convert the traction motor to accept and support roller bearings the frame 10 is machined at the pinion end 14 and the commutator end 16 to receive the roller bearings, which are of thicker cross section and shorter length than conventional sleeve bearings. Since both ends exhibits heavy loads with the heaviest loads at the PE, and portions of the frame 10 are removed during the machining to allow clearance for the roller bearings, brackets and inserts are added to improve the strength and rigidity of the frame 10.

Referring now to FIGS. 2A–2F, the pinion end 16 of the frame 10 is shown, prior to machining. The pinion end 16 includes both an upper insert 22 and a lower insert 24. The upper insert 22 includes a mounting pad 26 that is attached to three gussets 28, 30 and 32. The three gussets 28, 30, 32 are then further welded to the frame 10. Another insert 24 is positioned on the frame 10, for additional support and serves as a housing attachment point, after the frame 10 is machined. The lower insert 24 similar includes a mounting pad 36 attached to a fifth gusset 38, which is welded to the frame 10. A final added gusset 34, similar to the fifth gusset 38, is positioned between the frame and bearing housing mounting ring.

In accordance with the present invention, to maintain and further increase the strength in the frame 10 at the pinion end 16, a semi-cylindrical plate 39 is welded to the notch 20 at the pinion end 16. This plate 39 helps to restore strength by thickening this section of the frame, which tends to distort under heavy gear loads. This addition is possible because of the shorter length of the new roller bearings as compared to original sleeve bearings.

Referring now to FIGS. 3A–3D, the commutator end 18 of the frame 10 is shown, prior to machining. The commutator end 18 also includes an upper insert 40 and a lower insert 42. The upper insert 40 includes a mounting pad 44 attached to two gussets 46 and 48, which are welded to the frame 10. The lower insert 42 also includes a mounting pad 50 attached to the frame 10.

Figure 4B:
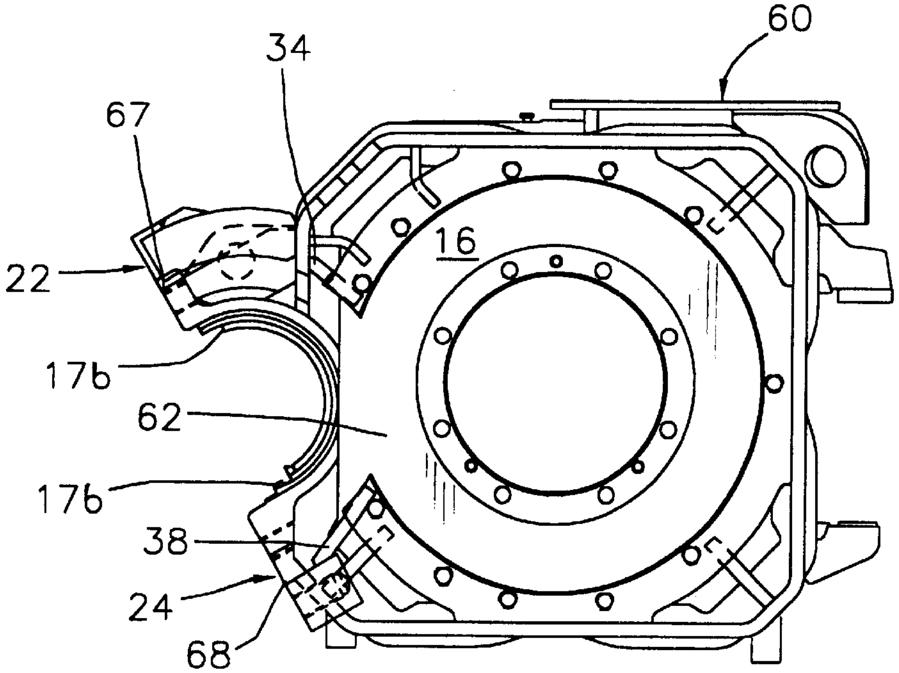
FIG. 4B is a side view of the machined frame of FIG. 4A from the pinion end.
Figure 4C:
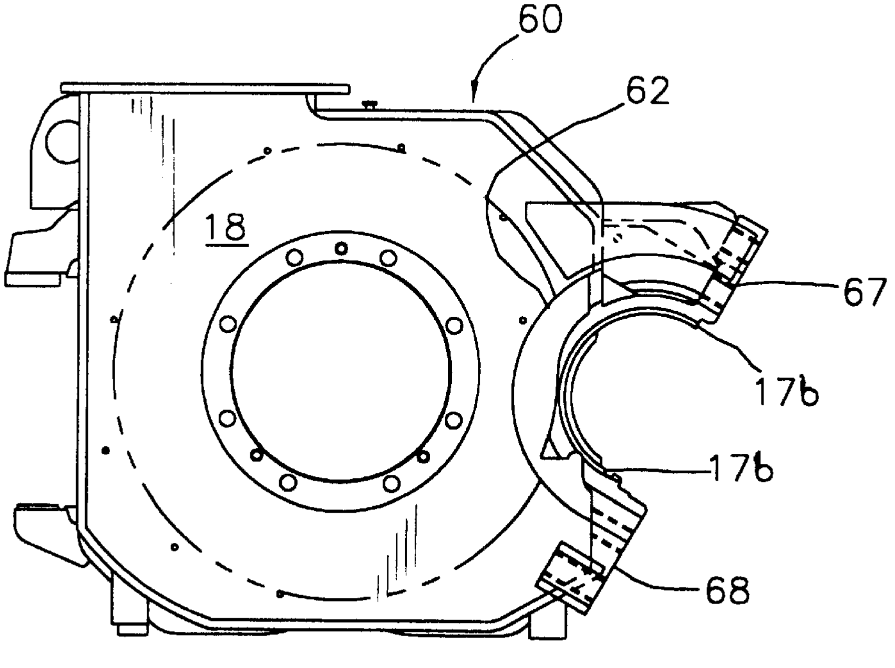
FIG. 4C is a side of view of the machined frame of FIG. 4A from the commutator end.
Figure 3C:
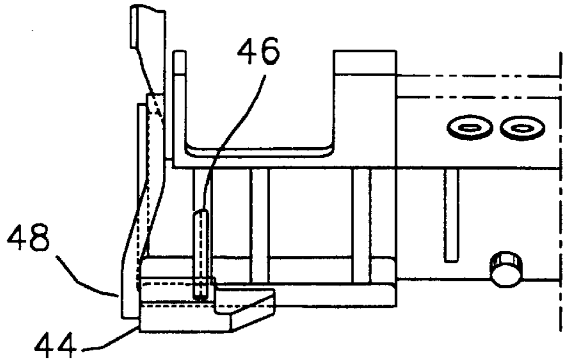
FIG. 3C is a top view of FIG. 3B.
Figure 3D:
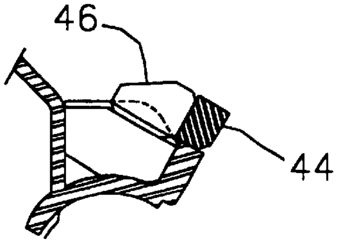
FIG. 3D is a cross sectional view of the upper inserts taken about section lines 3D—3D.
Figure 4A:
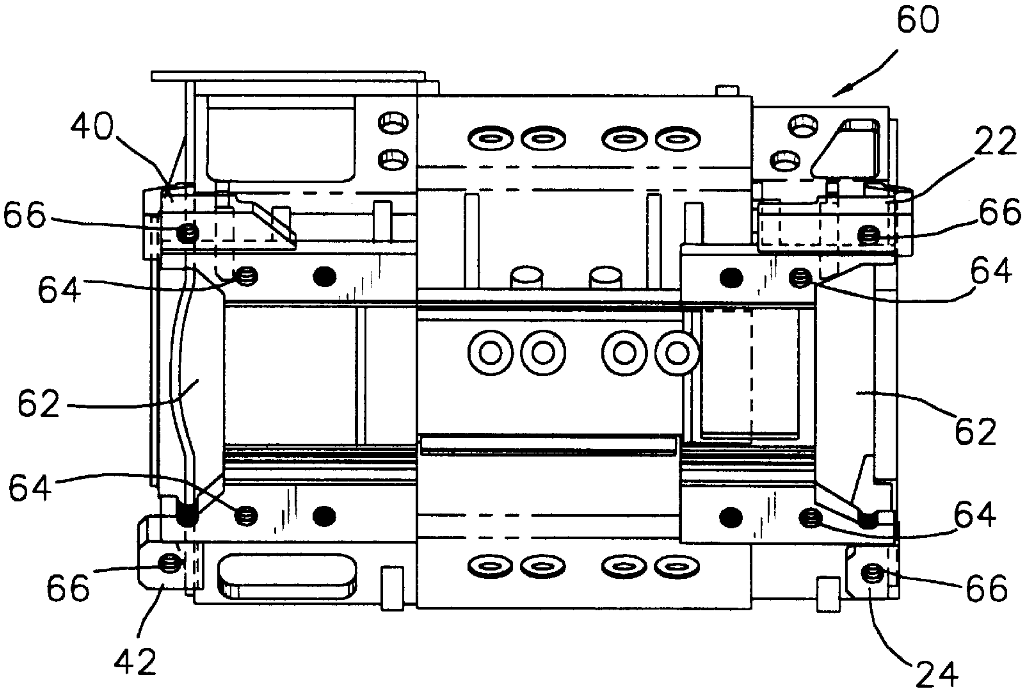
FIG. 4A is a front view of the traction motor frame after the frame is machined to receive the roller bearings.

Referring now to FIGS. 4A to 4C, once the inserts and brackets are attached to the frame 10, the frame may be machined, forming a machined frame 60. Recesses 62 are machined at the pinion end 16 and at the commutator end 18 to receive the roller bearings, which as mentioned above are of thicker cross section and shorter length than conventional sleeve bearings. When the frame is machined, one of the mounting holes 14 from each pair of mounting holes is cut out. As such, additional mounting holes 64 are drilled into the machined frame 11. In addition, to restore strength and stiffness to the machined frame 11 in the highly loaded regions of the cut outs a third mounting hole 66 is drilled into the upper inserts 22 and 40 and the lower inserts 24 and 42, thus increasing the mounting bolts (discussed in detail later) from four to six.

In addition, during the machining of the machined frame 60, upper and lower mounting faces 67 and 68 respectively on the pinion end 16 and commutator end 18 are resurfaced by light machining cuts for accurate location relative to the armature centerline. Moreover, the female splines 17*a* will also increase, referred to herein as "oversize female splines 17*b*" but this will be accommodated by corresponding increases in male splines, or "oversize male splines" (discussed in greater detail below). The resurfacing provides interchangeability among various components because a standard dimension is now surfaced into the machined frame 60. These standard dimensions further permit any converted traction motor frame to be used with any wheel and axle assemblies as opposed to the prior art, where the bearing caps were typically matched to a specific traction motor because both were line bored as a set.

Figure 5:
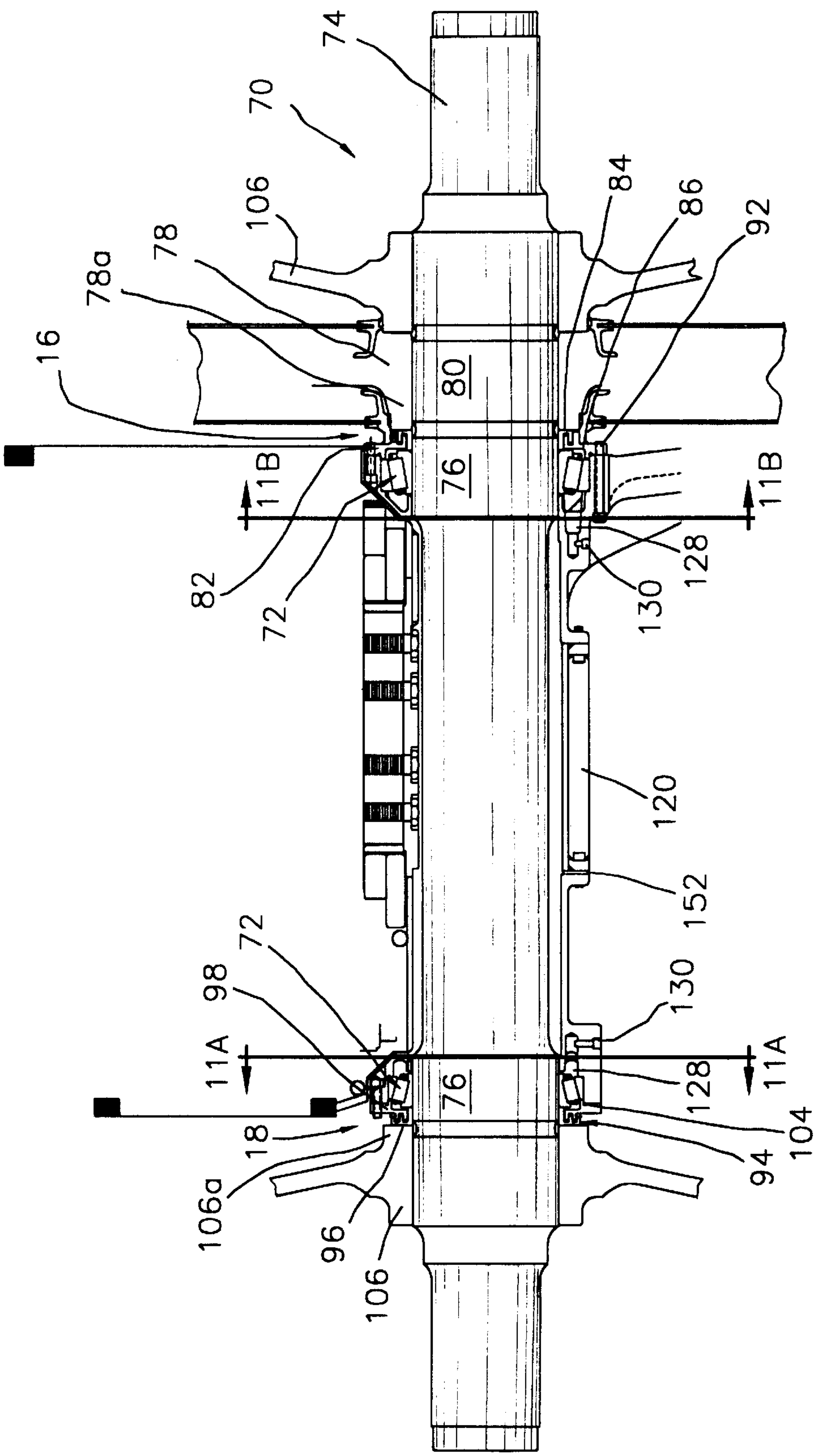
FIG. 5 is a cross sectional view of an axle/wheel assembly with roller bearings.
Figure 6:
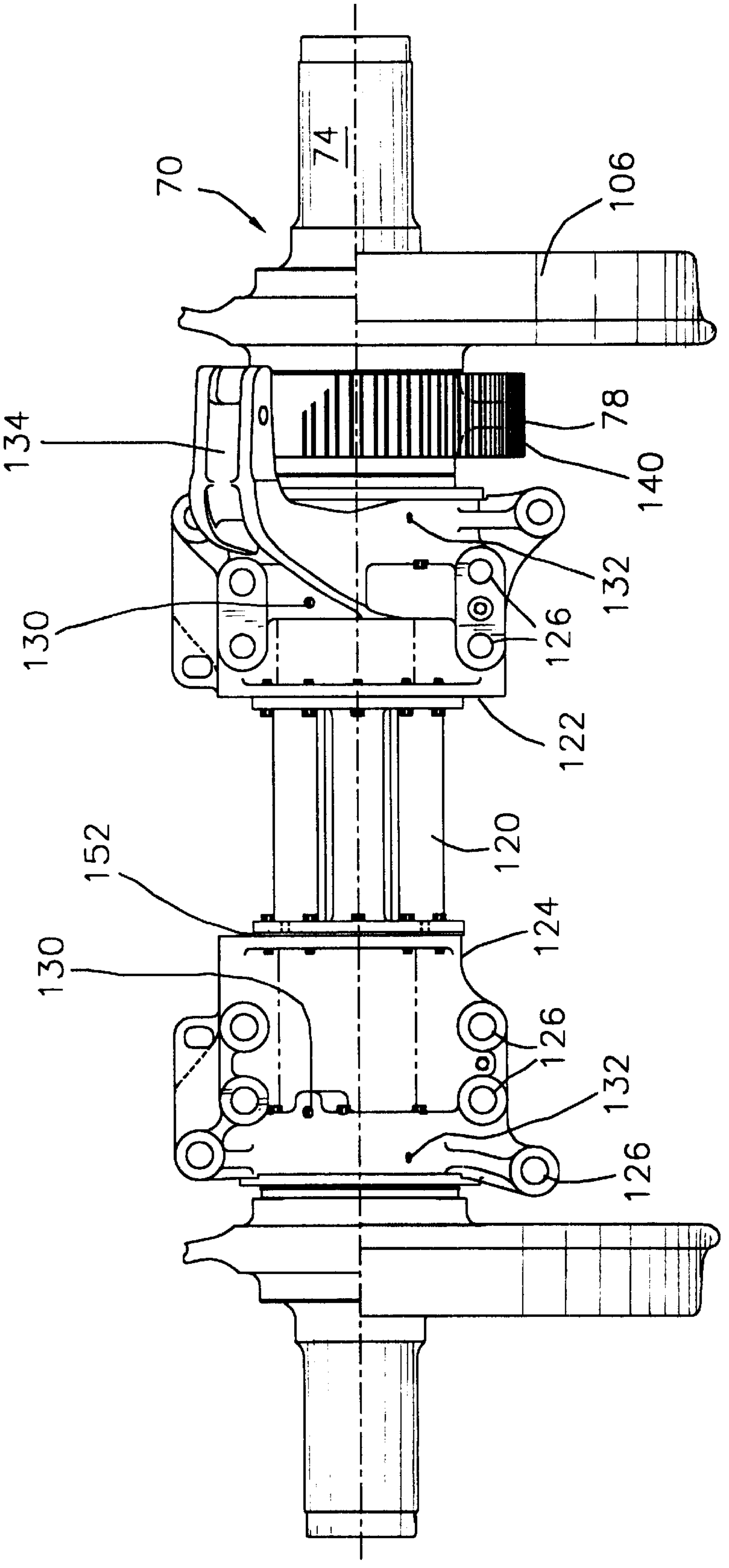
FIG. 6 is a perspective view of the axle/wheel assembly.

Referring now to FIGS. 5 and 6, after the frame is machined, an axle/wheel assembly 70 with roller bearings 72 may be prepared and attached to the machined frame 60. The axle/wheel assembly 70 includes a replacement axle 74 with either a standard or an oversize gear diameter. To accommodate for the roller bearings 72, the replacement axle includes roller bearing seats 76. The replacement axle 74 retains a standard or larger gear seat 80 such that a standard or oversize gear 78 may mount on the gear seat 80. By properly positioning the bearing seat along the replacement axle 74, the OEM gear, gear case and seal may continually be used.

Figure 7A:
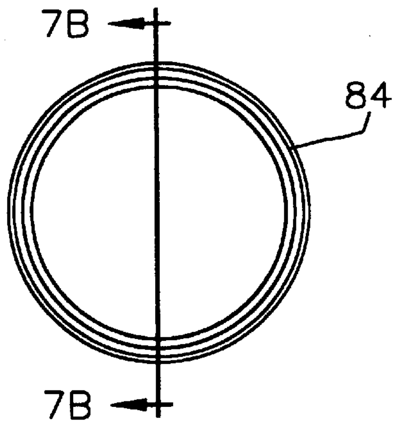
FIG. 7A is a front view of a pinion end spacer.
Figure 7B:
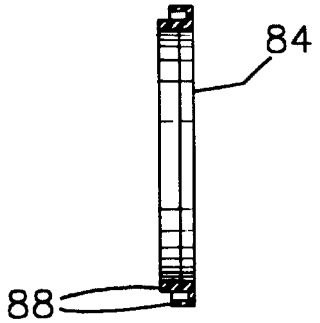
FIG. 7B is a cross sectional view of the PE spacer taken along section drawing is marked 7B—7B.
Figure 8A:
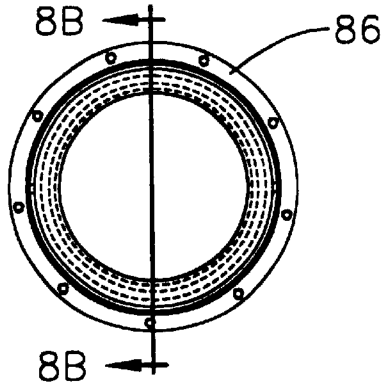
FIG. 8A is a front view of a pinion end bearing cap.
Figure 8B:
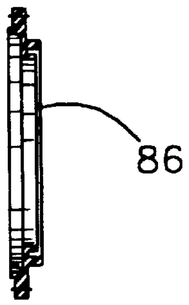
FIG. 8B is a cross sectional view of the PE bearing cap taken along section view 8B—8B.
Figure 8C:
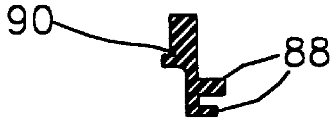
FIG. 8C is an enlarged view of the cap section.
Figure 9A:
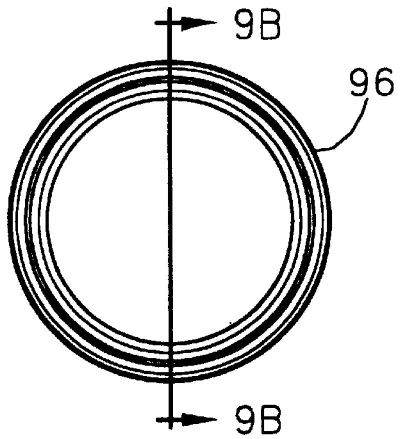
FIG. 9A is a front view of a commutator end spacer.
Figure 9B:
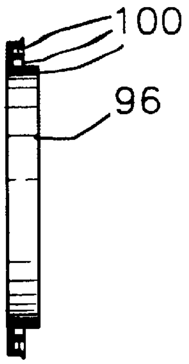
FIG. 9B is a cross sectional view of the CE spacer taken along section 9B—9B.
Figure 10A:
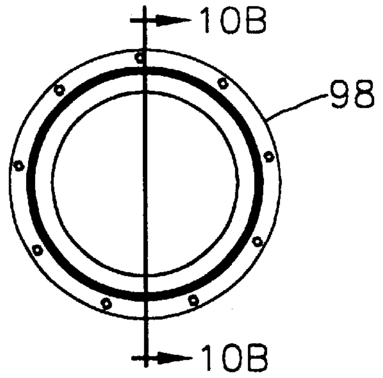
FIG. 10A is a front view of a commutator end bearing cap.
Figure 10B:
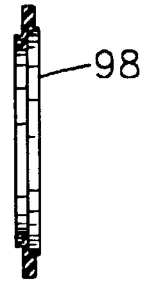
FIG. 10B is a cross sectional view of the CE bearing cap taken along section view 10B—10B.
Figure 10C:
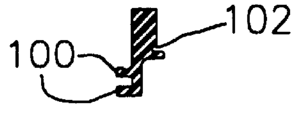
FIG. 10C is an enlarged view of the cap section.

At the pinion end 16 and at the commutator end 18, the axle/wheel assembly 70 includes a PE labyrinth seal 82 and a CE labyrinth seal 94, respectively. The PE labyrinth seal 82 rests against the gear hub 78*a* and includes a PE spacer 84 (FIGS. 7A–7B), a PE bearing cap 86 (FIGS. 8A–8C) and an O-ring 92. Both the PE spacer 84 and the PE bearing cap 86 have projections 88, which interconnect and alternate when assembled. Moreover, the PE bearing cap 86 also includes a recess 90 (FIG. 8C) that is sized accordingly to receive the O-ring 92. Similarly configured to the PE labyrinth seal 82, the CE labyrinth seal 94, which rests against a wheel hub 106*a*, includes a CE spacer 96 (FIGS. 9A–9B), a CE bearing cap 98 (FIGS. 10A–10C) and an O-ring 104. Both the CE spacer 96 and the CE bearing cap 98 have projections 100, which similarly interconnect and alternate when assembled. In addition, the CE bearing cap 98 also includes a recess 102 (FIG. 10C) that is sized accordingly to receive the O-ring 104.

Figure 11A:
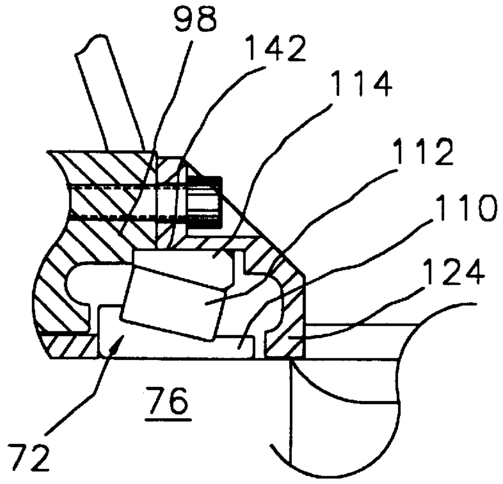
FIG. 11A is an enlarged sectional view of the roller bearing at the commutator end in FIG. 5.
Figure 11B:
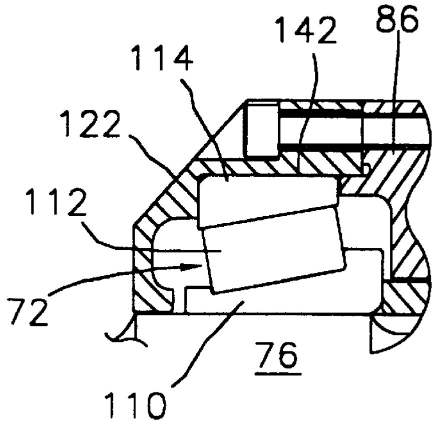
FIG. 11B is an enlarged sectional view of the roller bearing at the pinion end in FIG. 5.
Figure 12E:
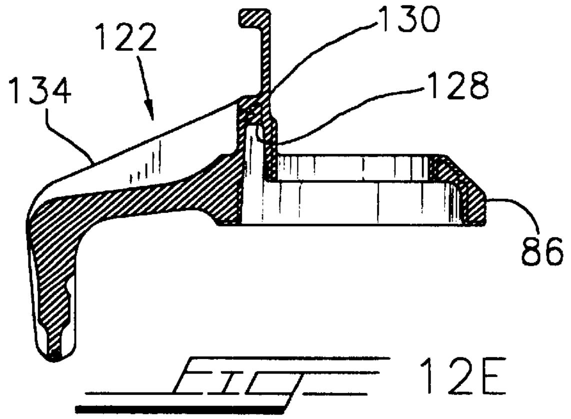
FIG. 12E is a cross section view taken along section view 12E—12E.
Figure 12C:
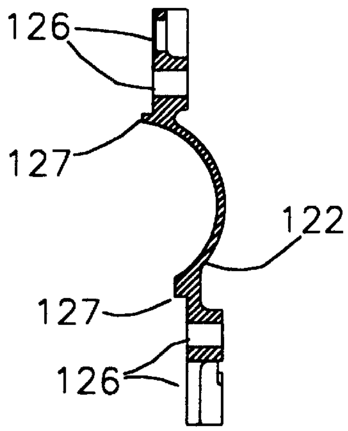
FIG. 12C is a cross sectional view taken along sectional view 12C—12C.
Figure 12A:
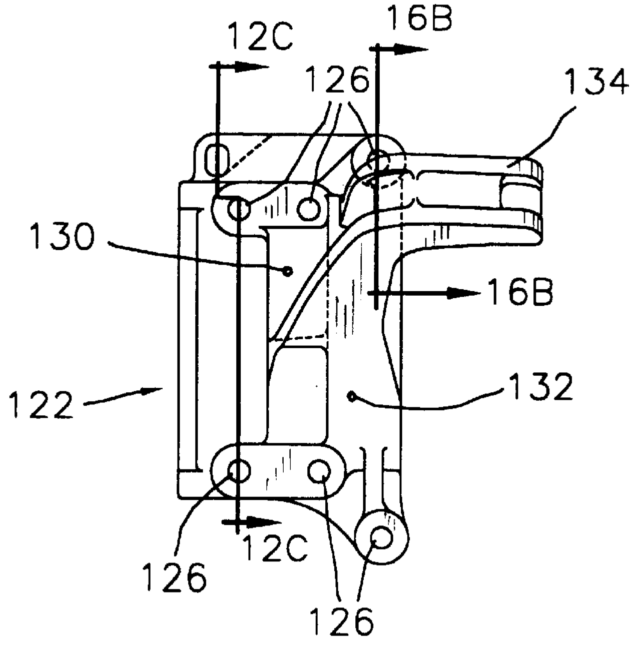
FIG. 12A is a front perspective view of a pinion end bearing housing.
Figure 12B:
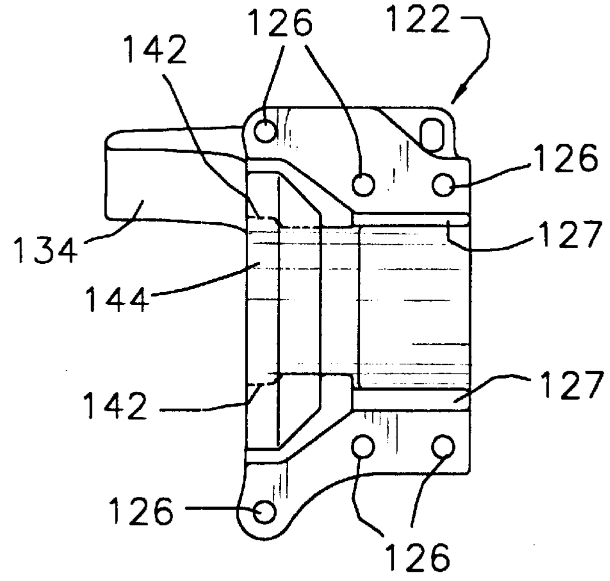
FIG. 12B is a rear perspective view of the PE bearing housing.
Figure 13C:
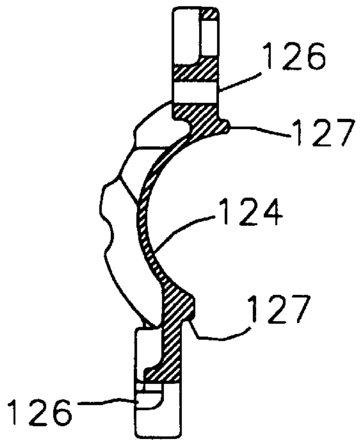
FIG. 13C is a cross sectional view taken along sectional view 13C—13C.
Figure 12D:
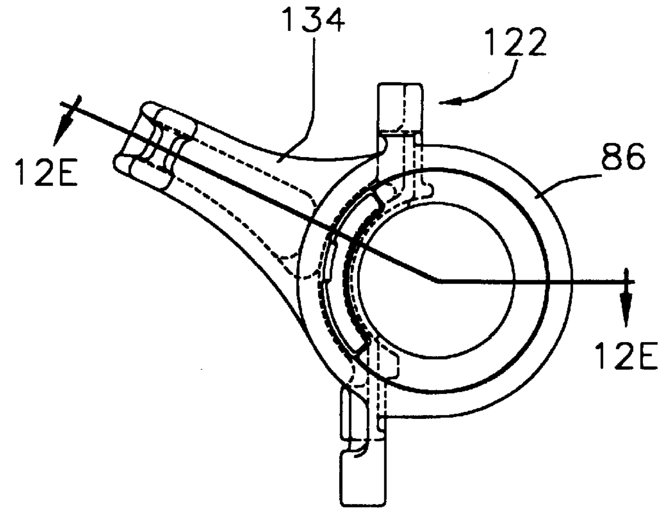
FIG. 12D is a pinion end side view of the PE bearing housing.
Figure 13A:
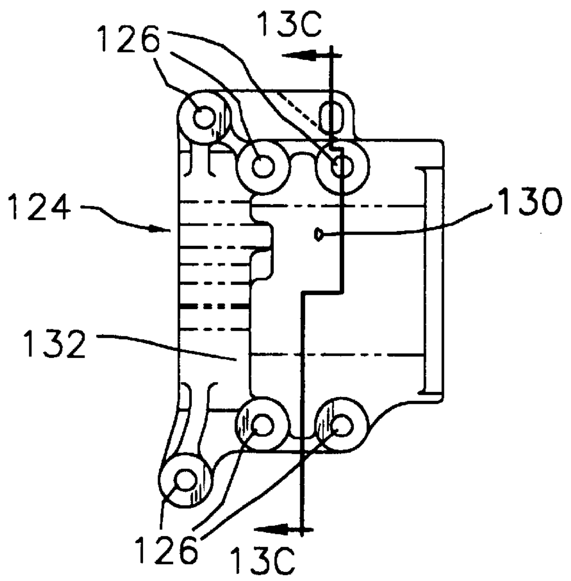
FIG. 13A is a front perspective view of a commutator end bearing housing.
Figure 13D:
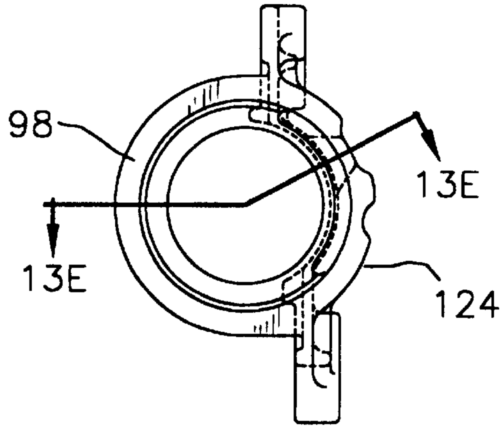
FIG. 13D is a commutator end side view of the CE bearing housing.
Figure 13B:
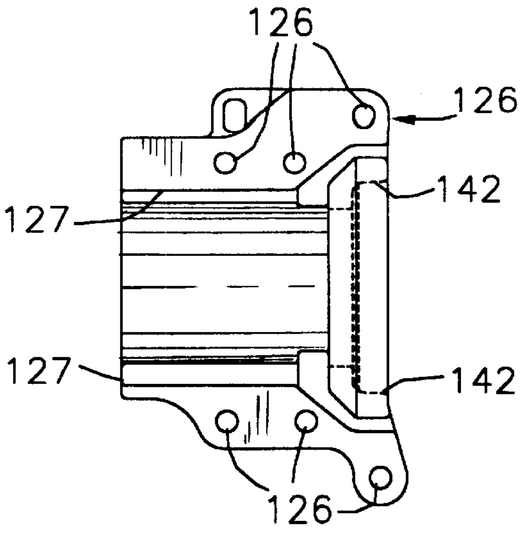
FIG. 13B is a rear perspective view of the CE bearing housing.

Positioned against each labyrinth seal are the roller bearings 72. (FIGS. 11A and 11B). The roller bearings 72 include an inner race 110 mounted on the axle 74 at the roller bearing seats 76. The rollers 112 are positioned between the inner race 110 and an outer race 114. When assembled to the machined frame 60, the outer race 114 is partially received and contained in the recess 62 machined in the pinion end 16 and commutator end 18 of the machined frame 11 (not shown). When attached to the machined frame 60, the axle/wheel assembly 70 includes an axle shield 120 and a PE bearing housing 122 and a CE bearing housings 124 in order to protect and support the axle 74 and the roller bearings 72.

Instead of using the sleeve bearing housing from the prior art, the present invention replaces the prior art bearing housing with new bearing housing, preferably cast in cast steel or ductile iron. The increase in housing section sizes and additional bolting compared to the replaced original axle bearing housing serves to restore strength and rigidity compromised from machining the traction motor. In accordance with the present invention, the PE bearing housing 122 (FIGS. 12A–12E) and the CE bearing housing 124 (FIGS. 13A–13E) further incorporate similar components and are referred to with the same numerals for both housings for clarity purposes. Each bearing housing 122 and 124 includes housing apertures 126, which correspond to the mounting holes 14, 64 and 66 on the machined frame 60. Each bearing housing 122 and 124 further includes a pair of oversize male splines 127, sized to be received by the oversize female splines 17*b*. When the bearing housings 122 and 124 are secured to the frame 60 the oversize male splines 127 insert into the oversize female splines 17*b* maintaining a tight spline fit between the bearing housings and the frame 60. The bearing housings 122 and 124 also include a reservoir 128, which is integrally cast into the bearing housings and is in communication with the roller bearings 72. An aperture 130, leading to the reservoir 128, permits access to the reservoir 128 and the roller bearings 72 for periodic grease additions. The capacity of the grease reservoir has also been increased from the prior art (not shown). Each bearing housing 122 and 124 may also include a temperature sensor 132 to monitor the internal temperatures of the roller bearings 72 (FIG. 2).

Figure 16A:
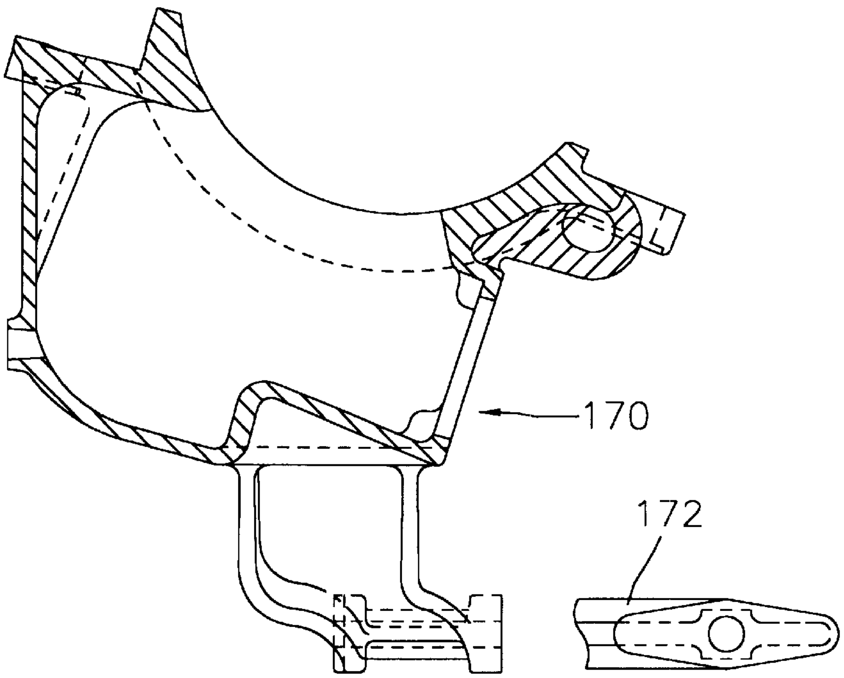
FIG. 16A PRIOR ART
FIG. 16A is a cross section view of a PE bearing housing in accordance with the prior art.
Figure 16B:
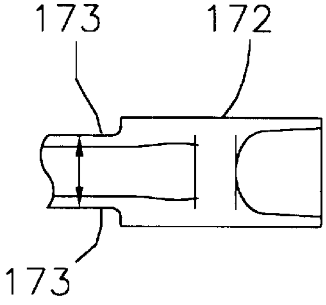
FIG. 16B PRIOR ART
FIG. 16B is a cross section view of the PE bearing housing support arm in accordance with the prior art.
Figure 16C:
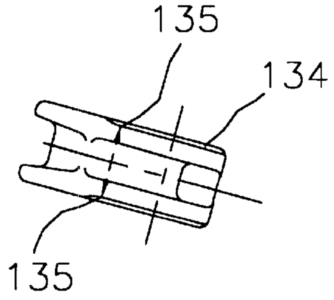
FIG. 16C is a cross section view of the PE bearing housing arm in accordance with the present invention.

The PE bearing housing 122 also includes a support arm 134 for supporting a gear housing 140 (FIG. 6). Also illustrated in FIG. 16A in accordance with the prior art, a prior OEM PE bearing housing 170 has a support arm 172 with a cross section height in the critical region of approximately 3½ inches. Due to the heavy loads exerted in this region, caused by the vibration during operation, the OEM bearing housing 170 trends to exhibit fatigue cracks in the support arm. However, the support arm 134 in accordance with the present invention FIG. 16C, has a minimum cross section of 4 inches, and thus tends not to crack under the same or heavier loads. This difference is possible because of the way that milling cutter runout is accommodated in the present invention. When casting the prior art support arm 172 relief regions 173 are cast into the arm 172 at the top and bottom, illustrated in FIG. 16B. The relief regions 173 provide clearance for the milling cutter, allow it to resurface the arm 172. However, this leaves a critical section thickness, as mentioned above, of approximately 3½ inches between the relief regions 173 with rough cast surfaces along the relieved regions. In accordance with the present invention, the milling cutters are positioned such that the cutters may cut into the support arm 134, along regions 135, leaving smooth machined regions and a minimum thickness of 4 inches between the regions 135.

Continuing to refer to FIGS. 12A–12E and 13A–13E, the bearing housings 122 and 124 further include a bore 142 integrally cast into the bearing housings 122 and 124 and sized to receive the outer race 114 of the roller bearings 72. Each bore 142 is integrally defined within the bearing housings 122 and 124 such that the roller bearings 72 are supported and secured in the bore 142 minimizing deflections in the roller bearings 72 caused by movement of the rollers 112. In addition, each bearing housing 122 and 124 includes a cap mounting 144 in which when assembled; the CE bearing cap 98 and the PE bearing cap 86 mounts therein. Moreover, as mentioned above, jacking bolts are eliminated because the tight spline fit between the oversize female and oversize male splines improves the alignment of the pinion and commutator end bearing housings 122 and 124 to the traction motor frame.

Figure 14A:
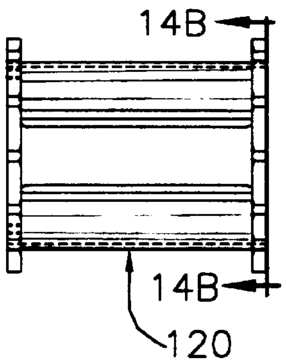
FIG. 14A is a front view of an axle shield.
Figure 14B:
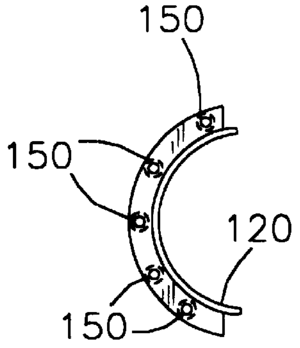
FIG. 14B is a side view of the FIG. 14A.
Figure 13E:
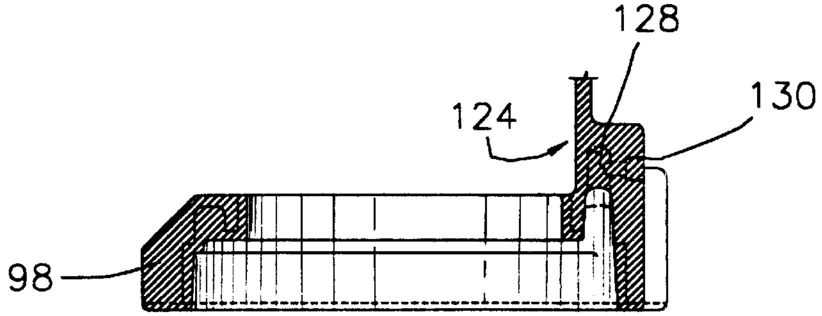
FIG. 13E is a cross section view taken along section view 13E—13E.

The axle shield 120 (FIGS. 14A–14B) is a semi-cylindrical housing that mounts between the PE bearing housing 122 and the CE bearing housing 124 via openings 150 in both ends of the axle shield 78. Before securing the axle shield 120 to the CE bearing housing 124, a shim 152 is positioned in between the axle shield 120 and the CE bearing housing 124, in order to adjust the length of the axle shield 120. Lastly, the axle/wheel assembly 70 includes a pair of wheels 106. The axle/wheel assembly 70 is secured to the machined frame 60 by aligning the mounting apertures 126 on the bearing housings 122 and 124 to the mounting holes 14, 64 and 66 on the machined frame 60.

Figure 15:
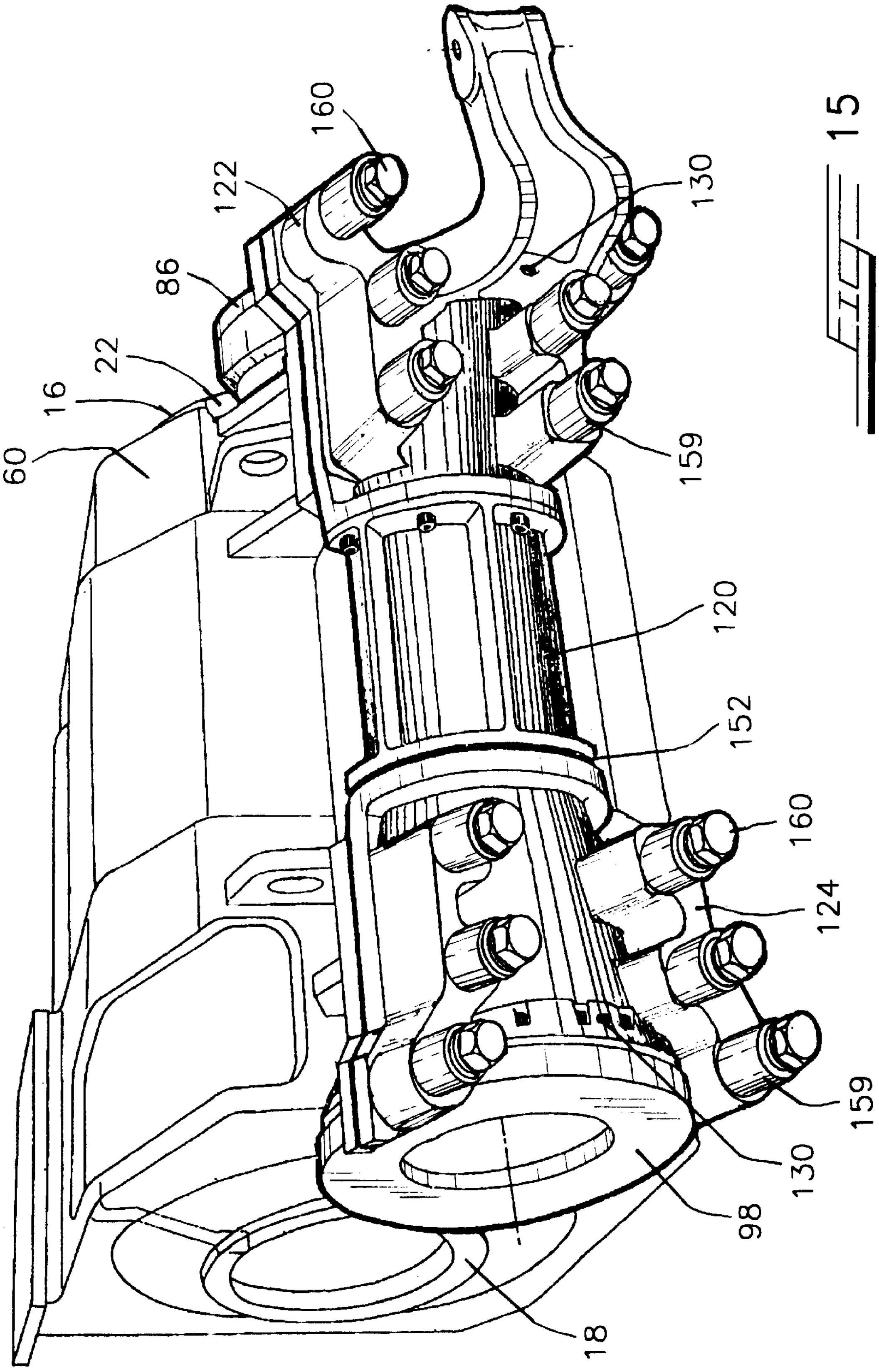
FIG. 15 is a perspective view of the axle shield and bearing housings attached to the machined frame in accordance with the present invention.

Referring now to FIG. 15, to accommodate for elongated bolts a spacer 159 is placed against each mounting aperture 126 on the bearing housings 122 and 124. The bolts 160 are then positioned within the mounting apertures 126, the spacers 159 and the mounting holes 14, 64, and 66 (FIG. 15). By utilizing six extra long bolts in each bearing housing, instead of the four bolts utilized in the prior art, the clamp load is increased, the torque loss in reduced and any problems caused by loosening bolts is reduced. Since loose bearing housing bolts may potentially cause catastrophic failure of the roller bearings, the additional bolts provide an improved bearing housings, which also strengthens the motor frame by very securely attaching the new heavy section bearing housings. The finished assembly is now ready for installation under a locomotive.

From the foregoing and as mentioned above, it is observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method of converting a traction motor assembly with sleeve bearings to roller bearings wherein the traction motor assembly includes sleeve bearings mounted on a axle/wheel assembly at a pinion end and commutator end and mounted in sleeve bearing housings that are secured to a motor frame through apertures in the motor frame sized to receive mounting bolts, the method comprising:

removing the sleeve bearings, sleeve bearing housings and axle/wheel assembly from the motor frame;

mounting upper and lower inserts at the pinion end and commutator end of the motor frame;

machining recesses in the motor frame at the pinion end and commutator end, the recesses sized to receive a roller bearing;

mounting a semi-cylindrical plate within a semi-cylindrical notch originally defined in the pinion end to accommodate the sleeve bearings, thus restoring strength to the machined frame;

replacing the axle/wheel assembly with a second axle/wheel assembly, the second axle/wheel assembly having a pair of roller bearing seats for receiving and mounting a pair of roller bearings;

providing a pair of roller bearing housings, each roller bearing housing having an integrally cast bore machined to receive the roller bearing, each roller bearing housing also having mounting holes sized to receive mounting bolts;

attaching a semi-cylindrical axle shield between the pair of roller bearing housing;

separately securing a pair of roller bearings on the pair of roller bearing seats and positioned on the axle within the mounting frame such that the roller bearings are received in the recesses; and aligning the mounting holes on the pair of roller bearing housings wither apertures in the motor frame such that the roller bearings are received in the recesses, and securing the pair of roller bearing housings to the motor frame via mounting bolts.

2. The method of claim 1 further comprising resurfacing a pair of oversize female splines in the pinion end and commutator end of the motor frame.

3. The method of claim 2 wherein each roller bearing housing further includes a pair of oversize male splines integrally formed thereon and sized to be received by the pair of oversize female splines, such that when the roller bearing housings are aligned and secured to the motor frame, a teight spline fit is maintained restoring strength and rigidity to the converted traction motor a as assembly.

4. The method of claim 3 wherein the step of machining recesses in the motor frame further comprises:

machining an additional aperture in the inserts for receiving a mounting bolt;

providing an additional mounting hole on each roller bearing housing, each additional mounting hole being aligned with the additional aperture in order to receive a mounting bolt; and placing a spacer against each mounting hole and the additional mounting hole on each roller bearing housing to accommodate an elongated mounting bolt, thereby restoring strength and rigidity to the converted traction motor assembly.

5. The method of claim 4 wherein the roller bearing housings are cast in ductile iron.

6. The method of claim 5 wherein the roller bearing housing for the pinion end has a support arm with a cross section critical region of approximately 4 inches.

7. A method of converting a traction motor assembly with sleeve bearings to roller bearings wherein the traction motor assembly includes sleeve bearings mounted on a axle/wheel assembly at a pinion end and commutator end and mounted in sleeve bearing housings that are secured to a motor frame through apertures in the motor frame sized to receive mounting bolts, the method comprising:

removing the sleeve bearings, sleeve bearing housings and axle/wheel assembly from the motor frame;

mounting upper and lower inserts at the pinion end and commutator end of the motor frame;

machining recesses in the motor frame at the pinion end and commutator end, the recesses sized to receive a roller bearing;

resurfacing a pair of oversize female splines in the pinion end and commutator end;

replacing the axle/wheel assembly with a second axle/wheel assembly, the second axle/wheel assembly having a pair of roller bearing seats for receiving and mounting a pair of roller bearings;

providing a pair of roller bearing housings, each roller bearing housing having an integrally cast bore machined to receive the roller bearing, each roller bearing housing also having mounting holes sized to receive mounting bolts, each roller bearing housing further includes a pair of oversize male splines integrally formed thereon and sized to be received by the pair of oversize female splines;

attaching a semi-cylindrical axle shield between the pair of roller bearing housing;

separately securing a pair of roller bearings on the pair of roller bearing seats and positioned on the axle within the mounting frame such that the roller bearings are received in the recesses; aligning the mounting holes on the pair of roller bearing housings with the apertures in the motor frame such that the roller bearings are received in the recesses, and the oversize male splines are inserted into the oversize female splines such that a tight spline fit is maintained restoring strength and rigidity to the traction motor assembly; and securing the pair of roller bearing housings to the motor frame via mounting bolts.

8. The method of claim 7 mounting a semi-cylindrical plate in the pinion end for restoring strength to the machined frame.

9. The method of claim 8 wherein the step of machining recesses in the motor frame further comprises:

machining an additional aperture in the inserts for receiving a mounting bolt;

providing an additional mounting hole on each roller bearing housing, each additional mounting hole being aligned with the additional aperture in order to receive a mounting bolt; and placing a spacer against each mounting hole and the additional mounting hole on each roller bearing housing to accommodate an elongated mounting bolt, thereby restoring strength and rigidity to the converted traction motor assembly.

10. The method of claim 9 wherein the roller bearing housings are cast in ductile iron.

11. The method of claim 10 wherein the roller bearing housing for the pinion end has a support arm with a cross section critical region of approximately 4 inches.

* * * * *